3,130,012
HANDLING OF SOLUTIONS CONTAINING
SELENIUM VALUES
John D. Prater, Salt Lake City, Archibald W. Maynard, Tooele, and William M. Tuddenham and Clifford E. Selin, Salt Lake City, Utah, assignors to Kennecott Copper Corporation, New York, N.Y., a corporation of New York
Filed July 8, 1960, Ser. No. 41,658
6 Claims. (Cl. 23—209)

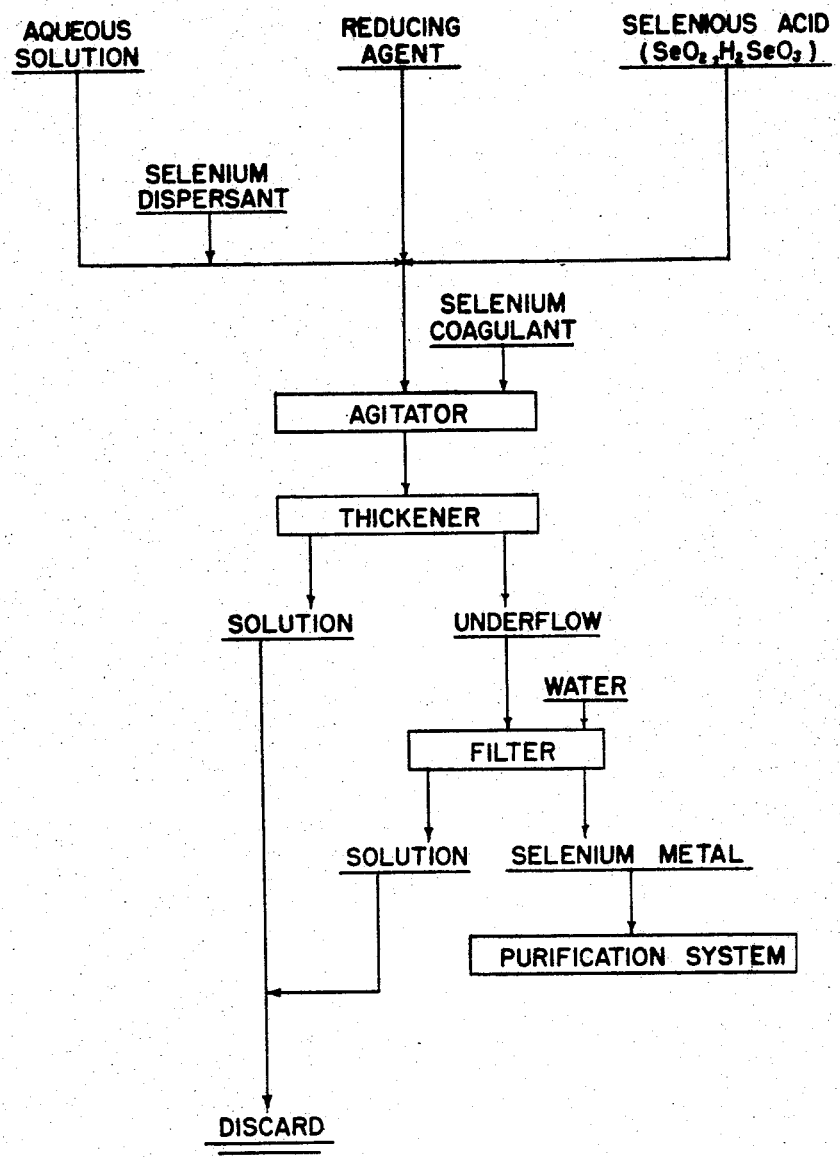

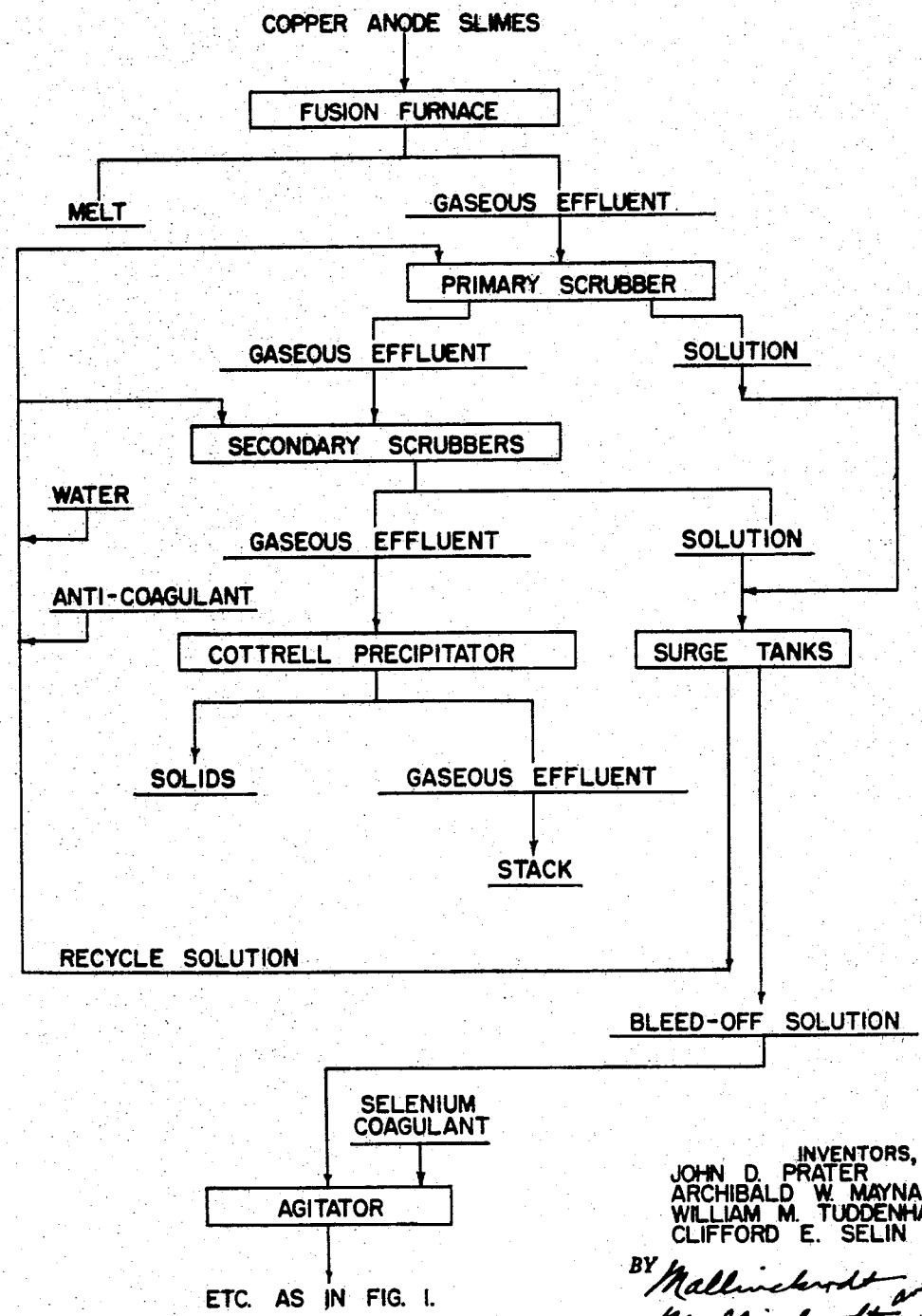

This invention relates to the handling of industrial solutions containing selenium values and is particularly concerned with processes for the removal and recovery of selenium values from gaseous effluents.

When sulfide ores are smelted for copper, various other constituents, such as precious metals, selenium, tellurium and arsenic, enter the matte and largely remain in the blister copper produced therefrom. These, together with some of the copper, are ordinarily present in recoverable quantity in the slimes which collect at the bottom of the electrolytic cells when the blister is refined to cathode copper.

These so-called "tankhouse slimes" are treated industrially in various ways for the recovery of the valuable constituents, e.g. copper, gold, silver, selenium, and tellurium. One important way of treating such slimes for this purpose is by first leaching with sulfuric acid to extract and recover an appreciable part of the copper and, thereafter, fusing the leached slimes with sodium sulfate and sulfuric acid. The selenium and some arsenic, sulfur dioxide, and sulfuric acid are volatilized in the fusion furnace and enter the flue system as a gaseous effluent, the selenium being present as selenium dioxide.

For removing the selenium and other harmful constituents from the gaseous effluent before releasing it to the atmosphere, it has been customary to pass the fumes through a series of scrubbing towers in countercurrent and contacting relationship with an aqueous scrubber solution. The water-soluble constituents, including the $SeO_2$, $SO_2$, and $H_2SO_4$, are taken up by the solution and dissolved, rendering it acidic, the remaining gaseous effluent being conducted to a Cottrell precipitator for removal of residual material before the effluent is discharged through the stack.

Considerable difficulty has been experienced with such scrubber systems, however, because the selenious acid which forms in the scrubber solution by dissolution of the selenium dioxide therein is reduced to elemental selenium by the sulfur dioxide also present in the solution, and such elemental selenium agglomerates into coarse particles which settle out of the solution and build up in the solution-transfer pipes and scrubbing towers, so that the system becomes plugged, necessitating frequent and costly shut-downs for cleaning. While this permits recovery of the deposited selenium, it seriously interferes with the fumes-treatment program.

We have now discovered that the foregoing difficulty can be effectively eliminated by maintaining a small amount of a selenium dispersant in the scrubber solution. This inhibits the settling out of the precipitated selenium and makes it possible to effect settling out as and when desired. Accordingly, plugging of the scrubber system is prevented and a selenium-carrying solution is obtained which is susceptible of treatment under controlled conditions for the recovery of the selenium.

One aspect of the invention, then, is to so treat an aqueous solution containing selenious acid that, when handled under reducing conditions, such as in the presence of $SO_2$ or hydrazine sulfate, substantially no selenium will be deposited. This is accomplished by adding a selenium dispersant to the solution prior to exposing it to the reducing conditions.

We have found that various anionic, surface-active reagents act as dispersants or anti-coagulants in controlling the growth of the precipitate and in maintaining the particles in a dispersed condition. Of these, salts of lignosulfonic acid have been found to be particularly efficient. Ammonium, sodium, and calcium lignosulfonates are obtained as by-products of the paper pulp industry and are commercially available under various trade designations, such as "Orzan A" and "Orzan S" (ammonium and sodium lignosulfonates, respectively, produced by Crown Zellerbach Corp.), "Marasperse C" (a calcium lignosulfonate produced by Marathon Corp.), and "Goulac" (another calcium lignosulfonate produced by American Gum Products). Among other effective materials obtainable commercially are "Palcotam" (a sodium salt of phenolic resins extracted from redwood bark by Pacific Lumber Co.), "Aerosol 18" and "Aerosol OS" (N-octadecyl disodium sulfosuccinamate and sodium isopropyl naphthalene sulfonate, respectively, produced by American Cyanamid Co.). In all instances, the particular selenium dispersant employed must be acid stable, in order to exert its effect in the acidic scrubber solution.

In the obtaining of the selenious acid solution from a gaseous effluent, such as fumes from a fusion furnace treating copper anode slimes, the reagent is added to the aqueous solution before such solution is introduced into the gas scrubbing system. The important thing is that the reagent be present before the selenium and the $SO_2$ are in solution. The concentration is not too critical. Depending upon temperature of the solution, selenium concentration, sulfuric acid concentration, etc., an amount as low as one gram per liter and even lower is effective in dispersing the elemental selenium formed by the reduction of the selenious acid.

Another aspect of the invention is treatment of the selenium-carrying solution for recovery of the elemental selenium. For this purpose, a selenium coagulant is added to the solution and steps leading to the settling out and separation of coagulated selenium in its elemental amorphous form are undertaken. Animal glue is preferred as the coagulant because of a special chemical reaction exhibited with respect to the lignosulfonate dispersants, but various commercial flocculating agents have been found effective, as will appear hereinafter.

What is presently regarded as the best mode of carrying out the invention appears from the following detailed description and the accompanying drawings.

In the drawings:

FIG. 1 is a flow sheet representing a generalized application of the method; and FIG. 2 is a flow sheet representing the first stage of the method as applied to the recovery of selenium from anode slime obtained as a by-product of electrolytic copper refining.

In the generalized approach of FIG. 1, the various components of an acidic aqueous solution to which the invention is applicable are indicated as coming together. Under ordinary conditions, the resulting solution would be subject to uncontrolled deposition of elemental selenium in the handling system, leading to undesirable conditions such as those previously described.

In accordance with the invention, however, a selenium dispersant is introduced into the system so as to go into solution prior to the going into solution of both the selenious acid and the reducing agent. As illustrated, the selenium dispersant is introduced into the aqueous solution prior to the introduction of the reducing agent and selenious acid, although either one or the other of the latter—but not both—could be introduced before the dispersant.

The so-treated solution may be utilized or disposed of as found appropriate in any particular instance, handling thereof being facilitated by the fact that there is no deposition of elemental selenium in the handling apparatus.

Nevertheless, recovery of selenium is an important aspect of the invention. Thus, the selenium-carrying solution will ordinarily be further processed for selenium recovery in the manner here taught.

According to the invention, the solution is passed to an agitator, where a selenium coagulant is introduced as the solution is being agitated. The resulting slurry is then treated by standard procedures, such as thickening and filtering, as indicated, for the separation and recovery of elemental selenium, which may be purified in the usual way.

During the coagulation step, heat may be applied to convert the red amorphous selenium to the gray crystalline form. Agitation in the coagulating step is important to insure rapid settling of the selenium after the addition of the coagulant. Tests indicate that rate of settling is a function of agitation, the reason probably being that too much adsorption of the coagulant by the particles first contacted thereby would occur otherwise.

Where, in practice, the selenium is being recovered from the flue gas products emanating from a fusion furnace employed to treat copper anode slimes, as shown by the flow sheet of FIG. 2, the gaseous effluent is passed from the furnace into the bottom of a primary scrubber, which is ordinarily a single tower. Aqueous solution containing the dispersant is introduced at the top from the solution-recycling circuit, which includes suitable surge tanks. The gas and the solution flow in countercurrent relationship to each other in the tower during which the water-soluble constituents in the gas dissolve. The gas then flows into the bottom of a secondary scrubber, which usually comprises a number of smaller towers connected in parallel, the solution being introduced into the top of each. After passage through these secondary scrubber towers, the gas passes to a Cottrell precipitator or the like, where residual material is recovered before discharge of such gas through the stack.

The scrubber solution is acid by virtue of the selenium dioxide, sulfuric acid, and sulfur dioxide dissolved therein. Selenium is precipitated by the reducing action of the sulfur dioxide on the selenium dioxide, and is prevented from settling by the presence of the dispersant, which maintains the precipitate in a highly dispersed state.

The solution is recycled in the scrubber system to build up its selenium content. Then, in accordance with preferred practice, a portion of the concentrated solution is bled off and treated for selenium recovery as in the flow sheet of FIG. 1.

The foregoing procedure lends itself to continuous operation, but, if desired, the solution may be completely removed from the circuit, when ready, and treated in a separate circuit for the recovery of the contained selenium values.

The following examples include laboratory tests illustrative of various aspects of the invention:

EXAMPLE 1

Two solutions were prepared at 90° F., one containing 5 g./l. Se, 50 g./l. $H_2SO_4$, and 10 g./l. $As_2O_3$, and the other containing the same constituents plus 2 g./l. of Orzan A. To both was added 1 g./l. of $SO_2$.

In the untreated first solution, 10% of the Se was precipitated and removed by filtration within one half hour. No additional selenium precipitated during a 24 hour period immediately subsequent. However, gassing the solution with addional $SO_2$ precipitated additional Se.

In the second solution containing Orzan A, no coagulation or settling occurred during a 72 hour period, even when additional $SO_2$ was aded. The selenium was found to exist in the colloidal state in this treated solution.

EXAMPLE 2

Four solutions were prepared containing various amounts of constituents as follows:

| Constituents | Solutions (grams/liter) | | | |
| --- | --- | --- | --- | --- |
| | A | B | C | D |
| Se | 10 | .5 | 100 | 100 |
| $H_2SO_4$ | 50 | 50 | 50+70 | 50 |
| $As_2O_3$ | 10 | | 5 | 5 |
| Orzan A | 0.5 | 1 | 1 | 1 |
| $SO_2$ | 2 | added | 1 | 10 |
| Glue | | 0.5 | 2 | |

Solution A was maintained at 90° F. for 10 days. It remained clear during the entire time.

Solution B was maintained at ambient temperature (about 70° F.). No precipitate settled out after gassing with $SO_2$. However, when the solution was agitated and 0.5 g./l. of glue was added, the selenium immediately coagulated and settled.

In the test conducted with solution C, before the further addition of sulfuric acid, no precipitation occurred in 5 days. The solution was maintained at a temperature of 90° F. After the solution was agitated and 70 g./l. of sulfuric acid added to that already in solution and after further gassing with $SO_2$, the addition of 2 g./l. of glue to the agitated solution resulted in virtually complete recovery of selenium (more than 99.9%).

Solution D was tested at 120° F. It became cloudy and appeared to contain particulate matter when made up at 120° F., but no settling out occurred even after three days at this temperature.

It will be noted from the results of the tests conducted on these solutions that, whether they contained 5 or 100 g./l. of selenium, as little as 1 gram of Orzan A prevented settling out of the precipitated selenium. It will also be noted that even as little as 0.5 g./l. of this dispersing reagent was sufficient to stabilize a solution containing 10 g./l. of selenium.

EXAMPLE 3

Tests were conducted to show that the amount of reagent added is not to any degree adversely affected by the amount of $SO_2$ added to precipitate selenium. Separate solutions were prepared, each containing 50 g./l. Se, 50 g./l. $H_2SO_4$, 5 g./l. $As_2O_3$ along with an amount of the dispersant, Orzan A, and of $SO_2$ as indicate in the following table, the $SO_2$ being added after the addition of the dispersant:

| Orzan A | $SO_2$ |
| --- | --- |
| 1 | 1 |
| 1 | 5 |
| 1 | 10 |
| 1 | 31 |
| 5 | 1 |
| 5 | 5 |
| 5 | 10 |
| 5 | 31 |

After four days, the solutions were separately centrifuged. No differences were noted in the solutions having the same $SO_2$ concentration by reason of the different concentrations of Orzan A. As the $SO_2$ content increased to 31 g./l., only a small amount of particulate matter (approx. 6% by weight of selenium in solution) could be removed by centrifuging.

The following example covers a full scale test carried out under actual working conditions in a plant handling copper anode slimes:

EXAMPLE 4

The test was carried out continuously over a seven day period. Approximately one gram per liter of Orzan A was added to an actual scrubber solution used for treating the gaseous effluent from a furnace in which the slimes were fused. The system was checked at the end of the seven day operating period, with the result that virtually no selenium was found in the scrubbers or in the solution-circulating system. Near the end of the operating period, the scrubber solution assayed 6.24 g./l. Se and 30.6 g./l. $H_2SO_4$. The selenium concentration of the solution had increased five fold compared with that of previous scrubber solutions not containing the reagent.

The scrubbers and the solution-circulating system of this plant have customarily required cleaning twice a week. The test run continued for two full weeks. Even with this extended period of time, inspection indicated virtually no settling out of selenium in any part of the system. The time of operation could have been substantially extended without difficulty.

A portion of the foregoing scrubber solution, which was removed near the end of the operating period, was treated for selenium recovery. Two samples were prepared, one in which about 2 g./l. of animal glue was added, and the other in which the same amount of glue was added along with 50 g./l. $H_2SO_4$. The slurries were allowed to stand about 15 hours and the coagulated selenium thereafter removed by filtration. About 96.5% Se was recovered from the one and 97.3% from the other.

As set forth hereinbefore, dispersants other than the Orzan A utilized in the above examples are effective in inhibiting the coagulation and settling of selenium precipitates. Indicative of this are tests conducted in the laboratory.

In one group of tests, solutions were prepared containing 10 grams per liter selenium, 7.5 grams per liter arsenic trioxide, 50 grams per liter sulfuric acid, 20 grams per liter sulfur dioxide, and 1 gram per liter dispersant. In all tests, the dispersant was added before the sulfur dioxide. Tests were made at 90° F.

Results of these tests were as follows:

*Dispersion of Selenium With Various Lignosulfonates*

| Dispersant | Observations |
|---|---|
| None | Selenium coagulated and settled within ½ hour. |
| Orzan A | No selenium settled after ten days. |
| Orzan S | Do. |
| Product 131 | Solution slightly cloudy. Small amount of selenium settled out. Estimated to be less than 10 percent of that settling out in ½ hour without additional reagent. |
| Product 152 | Solution slightly cloudy. Slight settling of selenium but less than 10 percent of that settling out without dispersant added. |
| Orzan A H-3 | No settling of selenium after 10 days. |
| Marasperse C | Do. |
| Marasperse N | Do. |
| Maracarb NC | Solution slightly turbid but no selenium settled out after 10 days. |
| Maracarb N | Do. |
| Goulac | Solution slightly cloudy but no settling of selenium after 10 days. Film deposited on glass walls. |

The dispersants used are identified as follows:

| Product | Producer | Salt Form | Reducing Sugars, as Glucose, Percent |
|---|---|---|---|
| Orzan A | Crown Zellerbach Corp | Ammonium | 17.5 |
| Orzan S | do | Sodium | 11.6 |
| Product 131 | do | do | 0.8 |
| Product 152 | do | do | 1.1 |
| Orzan AH-3 | do | Ammonium | 8.3 |
| Marasperse C | Marathon Corp | Calcium | None |
| Marasperse N | do | Sodium | None |
| Maracarb N | do | do | None |
| Maracarb NC | do | Sodium-Calcium | |
| Goulac | American Gum Products | Calcium | |

In a second group of tests, solutions were prepared containing 25 grams per liter selenium, 5 grams arsenic trioxide, 50 grams per liter sulfuric acid, 5 grams per liter sulfur dioxide, and 5 grams per liter dispersant. The dispersant in each test was added before the sulfur dioxide. The tests were made at ambient temperature.

Results of these tests were as follows:

*Dispersion of Selenium With Various Reagents Other Other Than Lignosulfonates*

| Dispersant | Observations |
|---|---|
| None | Immediate coagulation and settling of selenium. |
| Palcotan | No settling of selenium after 2 hours. |
| Aerosol OS | Do. |
| Aerosol 18 | Do. |

The dispersants used are identified previously herein.

Various coagulants other than animal glue are effective for the recovery of the selenium from the solution by which it is carried. For example, other animal protein products, such as gelatin and casein, are reasonably effective, as are several but not all commercial flocculants. The following table is based on laboratory tests utilizing 0.5 g./l. of the coagulant in a solution containing selenium dispersed by the addition of 1 g./l. of Orzan A:

| Flocculant | Type | Observation |
|---|---|---|
| Glue | | Good flocculation. |
| Gelatin | | Do. |
| Casein | | Do. |
| Aerofloc 548 | | Moderately good flocculation. |
| Aerofloc 550 | | Do. |
| Aerofloc 552 | | Do. |
| Aerofloc 3000 | | Very slight flocculation. |
| Dispersant NI-O | Non Ionic | Good flocculation. |
| Polyox Coagulant | | Moderately good flocculation. |
| Aerosol C-61 | Cationic | Good flocculation. |
| Alkaterge A (alcohol solution) | do | Do. |
| Locust Bean | | Virtually no flocculation. |
| Starch | | No flocculation. |
| Separan NP-20 | | Do. |

Since Alkaterge A is water insoluble, it was added in the form of an alcohol solution. The other coagulants were added in the form of water solutions.

Aerosol C-61 is an ethanolated alkyl guanidineamine complex produced by American Cyanamid Co. Dispersant NI-O is a condensation product of ethylene oxide and an alkyl phenol produced by Oronite Chemical Co. Alkaterge A is a cationic, water insoluble, substituted oxazoline produced by Commercial Solvents Corp. No specific information is available as to the Aeroflocs, which are produced by American Cyanamid Co., and the Polyox Coagulant, which is produced by Union Carbide Chemical Co.

We have found animal glue to be the most effective selenium-coagulating agent for our purposes and a lignosulfonate the most effective selenium dispersant. These two reagents apparently react chemically to produce exceptional results in the total process of the invention.

As previously indicated, a relatively small amount of the selenium dispersant will inhibit the settling of selenium over a broad range of solution compositions. Similarly, a relatively small amount of the selenium coagulant will effect coagulation and settling.

The temperature of the aqueous solution should not exceed the temperature at which the red amorphous selenium transforms or "cokes" to the gray crystalline form. This occurs at about 130° F. For this reason, we prefer that our working temperature not exceed about 120° F.

Whereas there are here illustrated and described certain preferred procedures which we presently regard as the best mode of carrying out our invention, it should be understood that various changes may be made without departing from the inventive concepts particularly pointed out and distinctly claimed herebelow.

We claim:

1. A process for the recovery of selenium from flue gas which precludes the build-up of selenium agglomerates on scrubber apparatus, comprising the steps of adding acid-stable dispersant for elemental selenium to an aqueous solution in a scrubbing tower in sufficient quantity to effectively retain elemental selenium in said aqueous solution; passing flue gas containing water soluble elements including selenium dioxide, sulfur dioxide, and sulfuric acid from a fusion furnace through said scrubbing tower; and passing said aqueous solution in contacting relationship with said flue gas, so that said aqueous solution takes up said water soluble elements from said flue gas, rendering it acidic, whereby said selenium dioxide forms selenious acid, which subsequently is reduced to elemental selenium by said sulfur dioxide and said elemental selenium is retained in suspension in said aqueous solution by reason of the presence of said selenium dispersant.

2. The process as set forth in claim 1, wherein the aqueous solution containing the elemental selenium in solution with the selenium dispersant is removed from the scrubber apparatus; and then a selenium coagulant is added to the solution to precipitate the elemental selenium from said aqueous solution.

3. The method set forth in claim 2, wherein the coagulant for elemental selenium is selected from the group consisting of animal glue, gelatin, casein, a condensation product of ethylene oxide and an alkyl phenol, and an ethanolated alkyl guanidineamine complex.

4. In a process for removing selenium values from a gaseous effluent containing same as selenium dioxide along with sulfur dioxide and sulfuric acid, wherein said effluent is contacted by an aqueous solution in which said selenium dioxide, sulfur dioxide, and sulfuric acid are dissolved, thereby rendering the solution acid and precipitating the selenium in elemental form; the method of preventing undesirable deposition of elemental selenium, comprising adding an acid-stable, anionic, surface-active reagent selected from the group consisting of a sodium salt of phenolic resins extracted from redwood bark, N-octadecyl disodium sulfosuccinamate, sodium isopropyl napthalene sulfonate, and ammonium, sodium, and calcium lignosulfonates to said aqueous solution prior to contact of the effluent therewith, as a dispersant for elemental selenium, said reagent being added in quantity effective to retain elemental selenium in suspension in the solution.

5. The method set forth in claim 4, wherein there are included the additional steps of conserving the solution which contains the dispersed selenium; and of adding thereto a coagulant for elemental selenium selected from the group consisting of animal glue, gelatin, casein, a condensation product of ethylene oxide and an alkyl phenol, and an ethanolated alkyl guanidineamine complex.

6. A process for recovering elemental selenium from flue gases containing same, a reductant therefor, and acid, comprising repeatedly contacting such a flue gas with an aqueous solution containing a lignosulfonate selected from the group consisting of ammonium, sodium, and calcium lignosulfonates and in quantity effective to retain in suspension elemental selenium which is formed in said solution; conserving the resulting selenium-carrying solution; adding animal glue to the conserved solution in quantity sufficient to effect coagulation and settling of the dispersed elemental selenium; and separating said elemental selenium from the solution.

References Cited in the file of this patent

UNITED STATES PATENTS

| | | |
|---|---|---|
| 1,915,703 | Towne et al. | June 27, 1933 |
| 2,406,666 | Clark et al. | Aug. 27, 1946 |
| 2,744,866 | Kahler | May 8, 1956 |
| 2,767,060 | Sloan | Oct. 16, 1956 |
| 2,775,509 | Lebedeff et al. | Dec. 25, 1956 |
| 2,860,954 | Bueker et al. | Nov. 18, 1958 |
| 2,863,761 | Ashley et al. | Dec. 9, 1958 |
| 2,929,777 | Clevenger | Mar. 22, 1960 |
| 3,008,806 | Godat et al. | Nov. 14, 1961 |

FOREIGN PATENTS

| | | |
|---|---|---|
| 805,019 | Great Britain | Nov. 26, 1958 |